United States Patent [19]

Bustamante

[11] Patent Number: 5,682,935
[45] Date of Patent: Nov. 4, 1997

[54] APPARATUS FOR FORMING AN INTERLOCKING JOINT

[76] Inventor: James M. Bustamante, 1750 N. Gulley, Dearborn, Mich. 48128

[21] Appl. No.: 747,630

[22] Filed: Nov. 13, 1996

Related U.S. Application Data

[60] Provisional application No. 60/006,621, Nov. 13, 1995.

[51] Int. Cl.$^6$ .................... B27F 1/08; B27M 3/00; B27C 1/00
[52] U.S. Cl. .................. 144/144.51; 144/144.1; 409/130
[58] Field of Search .............. 144/84–87, 144.1, 144/144.51, 144.52, 371, 372; 409/125, 130; 33/561, 561.1, 562, 565, 567

[56] References Cited

U.S. PATENT DOCUMENTS

| | | | |
|---|---|---|---|
| 4,607,673 | 8/1986 | McCord, Jr. | 144/144.51 |
| 4,781,230 | 11/1988 | Haug | 144/144.51 |
| 4,993,465 | 2/1991 | Cotton et al. | 144/371 |
| 5,038,841 | 8/1991 | Larmon | 144/371 |
| 5,048,580 | 9/1991 | Smith | 144/136.95 |
| 5,114,265 | 5/1992 | Grisley | 144/144.1 |
| 5,203,389 | 4/1993 | Goodwin | 144/356 |
| 5,215,134 | 6/1993 | Gudeman | 144/144.1 |
| 5,305,812 | 4/1994 | Ferencsik | 144/356 |
| 5,305,819 | 4/1994 | Boulanger et al. | 144/347 |
| 5,318,082 | 6/1994 | Von Hollen | 144/84 |
| 5,360,463 | 11/1994 | Dietterle et al. | 55/422 |
| 5,423,357 | 6/1995 | Szymanski . | |
| 5,507,331 | 4/1996 | Nakanishi | 144/371 |
| 5,598,878 | 2/1997 | Wirth, Jr. et al. | 409/130 |

*Primary Examiner*—W. Donald Bray
*Attorney, Agent, or Firm*—Gifford, Krass, Groh, Sprinkle, Patmore, Anderson & Citkowski, P.C.

[57] ABSTRACT

The template of the present invention is utilized in conjunction with a rotating cutting tool such as a router bit to form a self-mating, repeating, interlocking pattern in the edge of a work piece. The template has a body having an elongated edge having a plurality of notches formed therein. Each notch has two sides and an innermost edge, the notches being spaced along the elongated edge at equal intervals. Each notch has at least one S-shaped side which has an outer curved portion and an inner curved portion, the radius of the inner curved portion being equal to three times the radius of the outer curved portion. The rotating cutting tool is spaced apart from the elongated edge of the template by a distance equal to the radius of the outer curved portion of the S-shaped side wall so that, as the cutting tool is guided along the edge of the template, an interlocking, self-mating pattern is formed in the work piece edge.

10 Claims, 4 Drawing Sheets

APPARATUS FOR FORMING AN INTERLOCKING JOINT

This application claims the benefit of U.S. provisional application Ser. No. 60/006,621, filed Nov. 13, 1995.

FIELD OF THE INVENTION

The present invention relates generally to an apparatus for forming interlocking joints, and more particularly to an apparatus for forming a repeating, interlocking joint.

BACKGROUND OF THE INVENTION

A variety of machines and other tools are commonly used to form interlocking joints in the manufacture of boxes, tables, dressers and other furniture such as dovetail joints. The dovetail joint typically includes a series of quadrangular pins formed in a first edge which are mated to a series of quadrangular cutouts formed in a second edge, the pins and cutouts being formed by separate templates.

Dovetail joints may be formed using a hand-held electric router, a straight router bit, a dovetail router bit, and two templates, these tools being required as the angular corners of the dovetail cutouts and pins do not lend themselves to formation by a rotating router bit. As a plurality of tools must be used, tool costs associated with forming dovetail and other similar joints are high. Increased set up and manufacturing time is another factor which decreases the efficiency of utilizing existing machines and other tools for forming interlocking patterns on the edge of a work piece.

In forming interlocking joints in general, two patterns are typically utilized. One pattern is formed in the edge of a first work piece, and the other pattern is formed in the edge of a second work piece which is to be mated to the first work piece. These interlocking joints are frequently formed by large, complicated equipment.

U.S. Pat. No. 5,114,265 to Grisley discloses an interlocking joint having identical curved edges on fingers which interlock.

U.S. Pat. No. 5,318,082 to VonHollen discloses a universal jointer which is accurately positionable and firmly attached to mating members of a work piece which enables a hand-held router utilizing a variety of bits to be guided along one of a series of removable templates to cut a interlocking pattern into the edge of a work piece. The universal jointer disclosed by VonHollen forms a variety of joints, many of which are a variation of the dovetail joint, but a multiplicity of tools are required to form such joints.

U.S. Pat. No. 4,993,465 to Cotton et al. discloses a specialized router tool having contoured sides to produce work pieces with alternating contour mating surfaces. The contoured router tool is moved along the work piece edges so that the contour of the router tool is replicated in the work piece edge. When the contoured work piece edges are mated, the alternating contour surfaces mate without additional forming operations being required.

U.S. Pat. No. 5,305,812 to Ferencsik discloses a bench-mounted programmable woodworking dovetail machine which does not utilize guide templates. Work pieces are fixably mounted on a machine, and pins and tails for interlocking dovetail joints are formed in the ends of the work pieces based upon operator input commands from a computer control station.

Although the prior art provides many complex and specialized methods of and tools for forming joints, there remains a need for a simple, inexpensive method and apparatus to form a interlocking joint quickly and reliably utilizing commonly available tools such as a router.

SUMMARY OF THE INVENTION

The present invention is directed toward a template for forming a repeating interlocking pattern in the edge of a work piece such as a panel utilizing a rotating cutting tool such as a rotating router bit, the router bit having a given diameter and being spaced apart from the template by a given distance. The rotating router bit is guided along the template which has been fixed to the work piece. When the interlocking pattern has been formed in the edges of two work pieces, the work pieces may be mated so as to form an interlocking joint.

The template has a body having an elongated edge and a lower surface. The lower surface of the body is positioned against the work piece. A plurality of notches are formed in the elongated edge of the body, each notch having two sides and an innermost edge. The notches are positioned along the edge at equal intervals. Each notch has at least one S-shaped side having an inner curved portion and outer curved portion, the inner and outer curved portions facing opposite directions so as to form an S or a reverse-S shape. Each curved portion has a center point, the center points being aligned along an axis which is perpendicular to the elongated edge of the work piece.

The distance between the edge of the inner curved portion of the template and the inner center point is the inner radius, which is equal to three times the distance between the edge of the cutting tool and the elongated edge of the template. The distance between the edge of the outer curved portion of the template and the outer center point is the outer radius, which is equal to the distance between the edge of the cutting tool and the elongated edge of the template.

In the preferred embodiment, only one side of the notch is S-shaped. The remaining side is substantially straight and perpendicular to the elongated edge of the template.

The innermost edge of the notch, in the preferred embodiment, is straight and parallel to the elongated edge of the work piece. The elongated edge is configured so as to be complementary to the innermost edge so that, upon mating of the two work pieces, the innermost edge of one panel or work piece is proximate to the elongated edge of the other panel or work piece. Alternate embodiments of the innermost edge and outermost edge may include innermost edges which are shaped or contoured in a manner complementary to the elongated edge.

In an alternate embodiment, the length of the template and the position of the notches in the elongated edge of the template are fixed so that the template is self-aligning on the work pieces so that the pattern formed in the edges of the work pieces mate without further adjustment.

Other objects, advantages and applications of the present invention will be made clear by the following detailed description of a preferred embodiment of the invention. The description makes reference to drawings in which:

DETAILED DESCRIPTION

Figure 1:
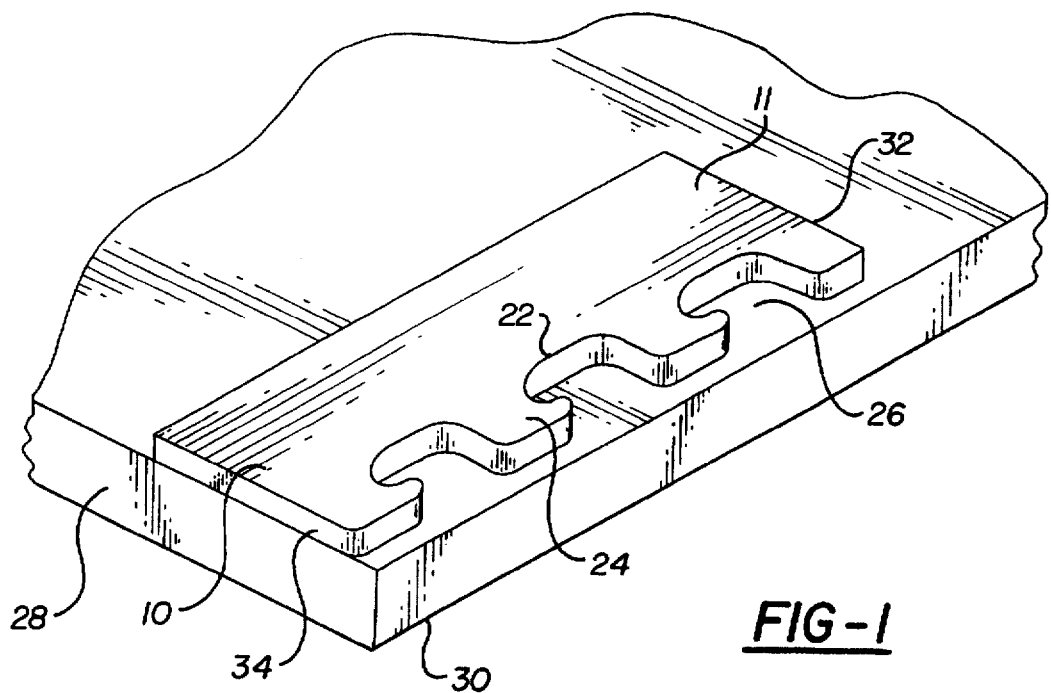
FIG. 1 is a perspective view of the preferred embodiment of the template of the present invention positioned on a work piece.

The template 10 of the present invention, shown in the preferred embodiment in FIG. 1, includes a body 11 having an elongated edge 14 having formed therein a plurality of tabs 24 and notches 26 having two sides and an innermost edge 22.

Figure 2:
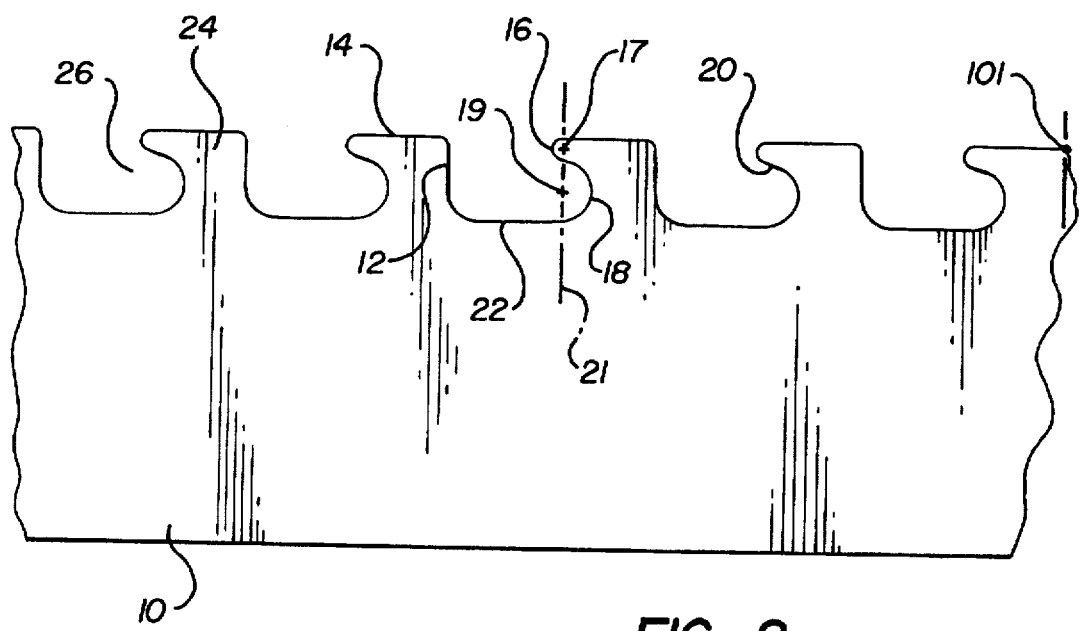
FIG. 2 is a side view of the preferred embodiment of the present invention.
Figure 3:
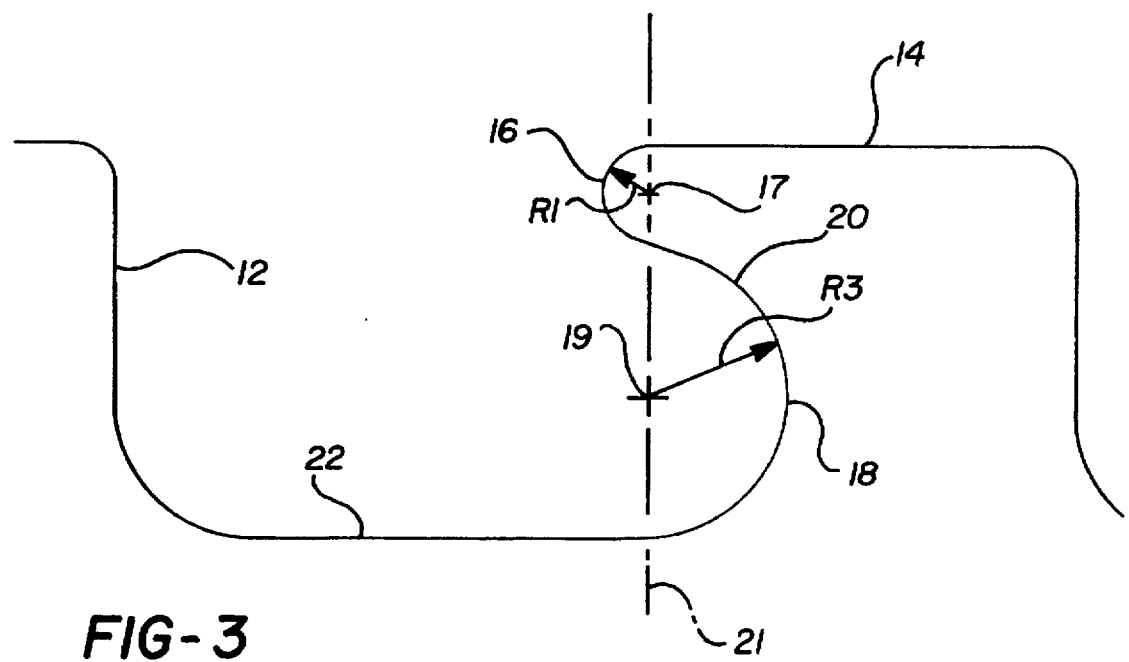
FIG. 3 is an enlarged view of the tab and notch depicted in FIG. 2.

At least one side of notch 26 is S-shaped, and as noted at 20 in FIG. 2 and in FIG. 3, has an outer circular portion 16 and an inner circular portion 18. Outer circular portion 16 has a center 17 which is spaced apart from the edge of outer circular portion 16 by distance R1. Inner circular portion 18 has a center 19 which is spaced apart from the edge of inner circular portion 18 by a distance R3, which is three times the distance R1. The centers 17 and 19, in the preferred embodiment, are aligned along an axis 21 which is roughly perpendicular to the edge 14 of template 10, such that S-shaped edge 20 is also roughly perpendicular to elongated edge 14.

In the preferred embodiment, one side of notch 26 is substantially vertical, as shown at 12 in FIG. 2. Inner circular portion 18 blends into inner edge 22, which is roughly parallel to elongated edge 14. Inner edge 22 at its leftmost point leads into vertical edge 12 of the next adjacent tab 24.

Figure 5:
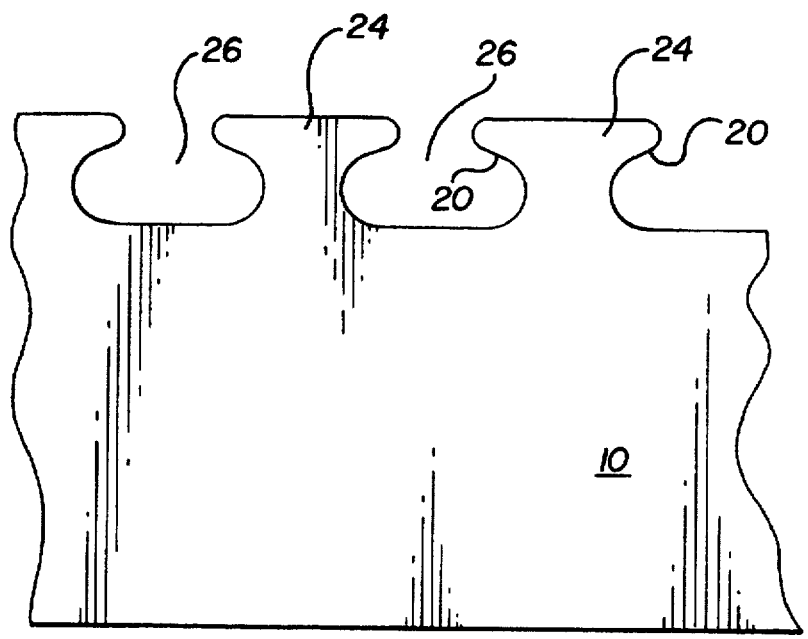
FIG. 5 is a side view of an alternate embodiment of the present invention.

The alternate embodiment depicted in FIG. 5 shows a notch 26 which has two S-shaped sides 20. Additional embodiments may have a contoured innermost edge, elongated edge 14 being shaped in a complementary fashion.

Figure 7:
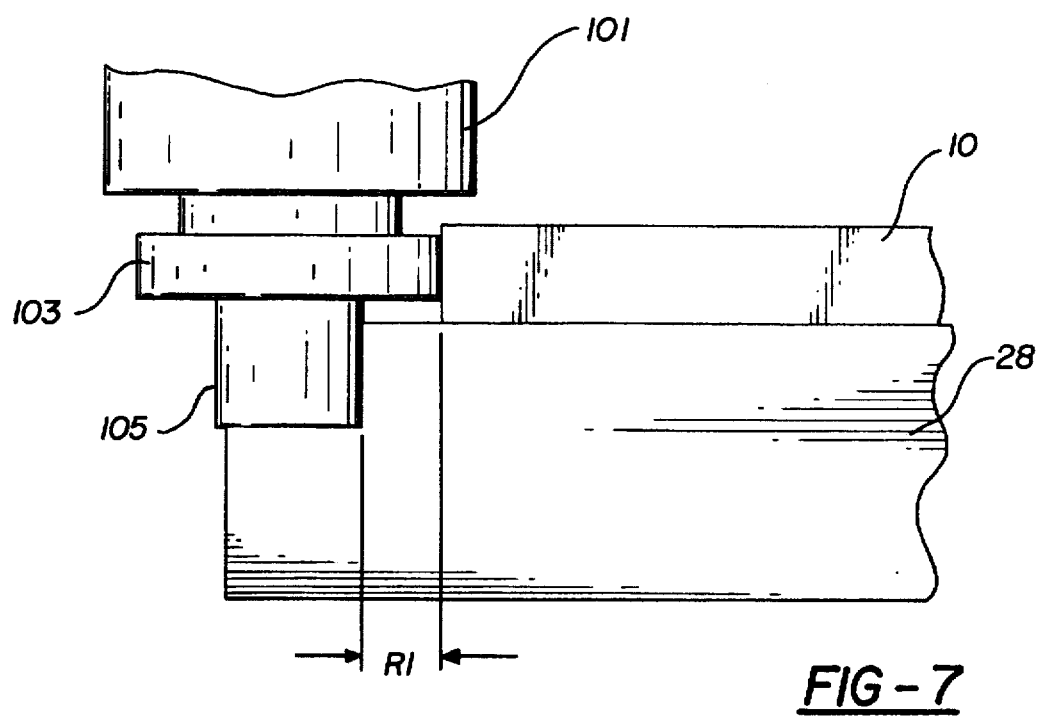
FIG. 7 is a view of the template, work piece and router.

As shown in FIG. 7, the template 10 is placed on the work piece 28. A router 101 having a guide member 103 is positioned next to template 10 so that the elongated edge 14 of template 10 is in contact with the edge of the guide member. The distance between the edge of the guide member 103 which is in contact with the template 10 and the cutting edge of the rotating router bit 105 is equal to R1.

Figure 6:
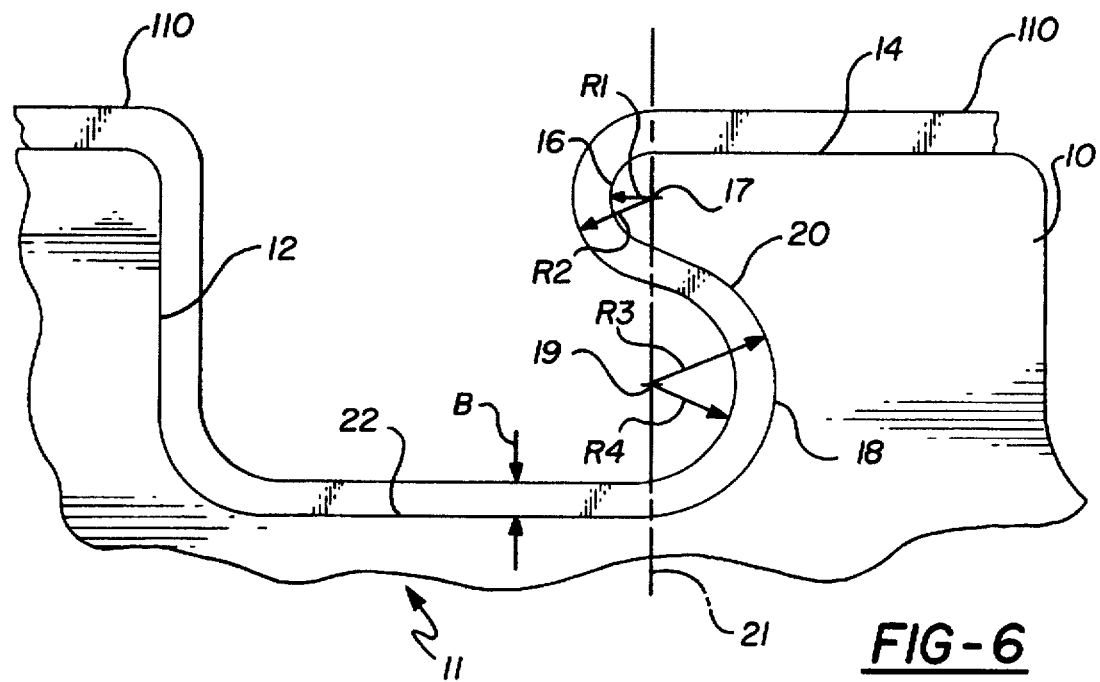
FIG. 6 is a view of the template and panel.

As the guide member 103 and rotating router bit 105 are moved along the S-shaped edge, the pattern which is cut into the work piece or panel is shown as edge 110 in FIG. 6. Edge 110 includes an S-shaped region having circular portions with radiuses R2 and R4. R2, emanating from center point 17, is equal to R1 plus the distance between the edge of the guide member and the edge of the rotating router bit, which is equal to R1. Thus, R2=2R1. In a similar fashion, R4, emanating from center point 19, is equal to R3 minus the distance between the edge of the guide member and the edge of the rotating router bit, which is equal to R1. Since R3=3R1, then R3-R1=2R1=R4. Thus, the resulting S-shaped edge interlocks smoothly with other similar edges cut into the edges of mating work pieces.

As evident from the figures, the resulting pattern is a smooth, continuous pattern having radiused rather than sharply angled edges. The template of the present invention eliminates jagged and feathered edges commonly associated with dovetail and other interlocking joints.

The template of the present invention is used to form the above-described interlocking pattern into the mating edges of two panels. The interlocking pattern is configured to provide an aesthetically pleasing series of notches in the edge of a panel which will securely mate with identical notches formed in the edge of a mating panel. Thus, the interlocking pattern results in a joint which provides a strong, secure and attractive connection between two panels.

Figure 4:
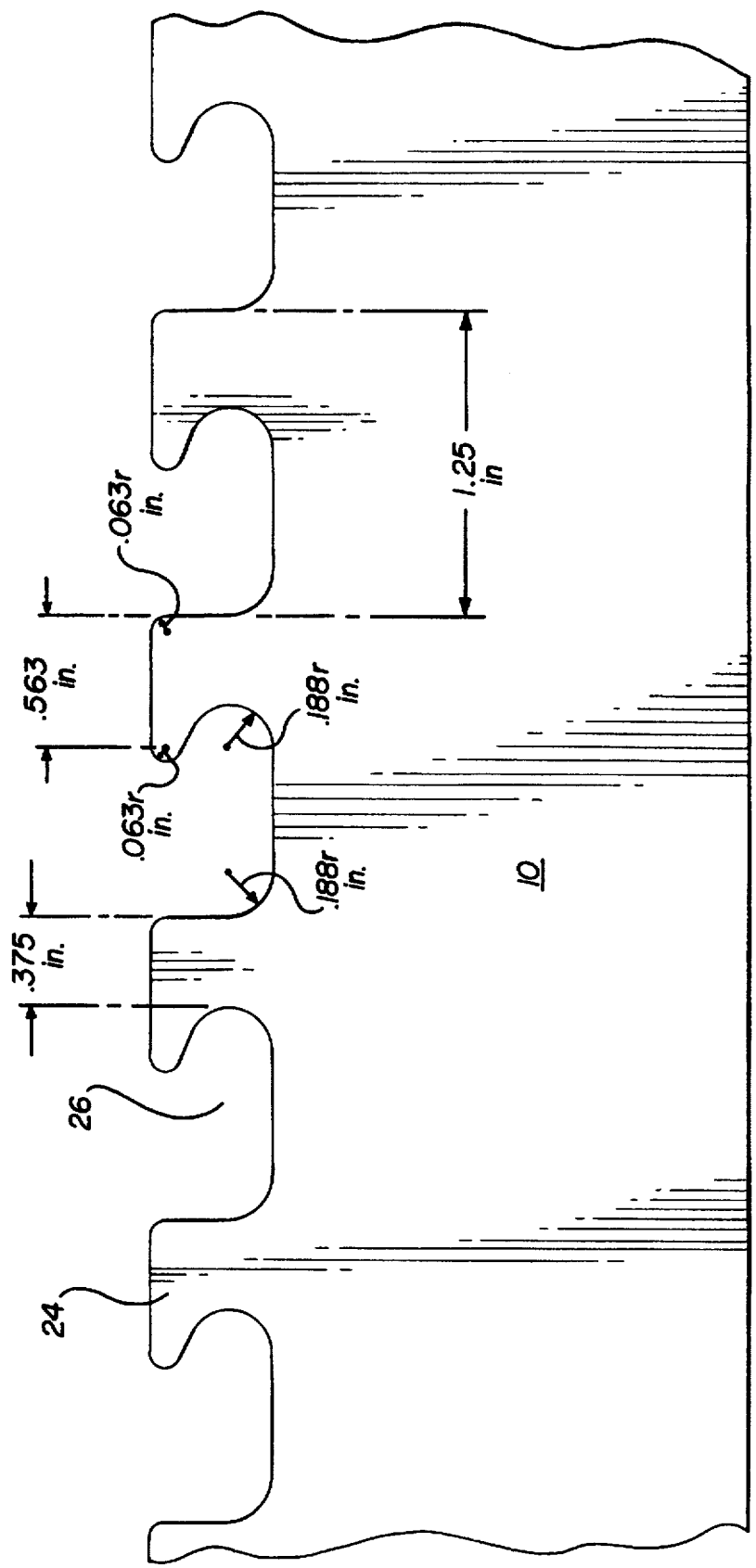
FIG. 4 is a side view of the embodiment depicted in FIG. 2 indicating preferred dimensions.

A particular embodiment of the template is shown in FIG. 4, wherein the features depicted in FIG. 1 are dimensioned.

As depicted in FIG. 1, side edges 32 and 34 of the template are spaced apart from the outer center point 17 of the notch closest to the respective edge 32 or 34 by an equal distance, preferably 0.563 inches. Thus, if side edge 32 is aligned with the edge of one work piece while forming the interlocking pattern, and side edge 34 is aligned with the edge of the mating work piece while forming the interlocking pattern in the mating work piece, the work piece edges aligned with template edges 32 and 34 will be in the same plane when mated. Other self-aligning methods may be utilized in conjunction with the template of the present invention.

The template may be constructed of a variety of materials, including metals such as aluminum or plastics such as polycarbonates. In a preferred embodiment of the template, the template thickness is no greater than half an inch, and preferably does not exceed 0.25 inches in thickness.

Having described the various embodiments of the present invention with reference to the accompanying figures, it will be appreciated that various changes and modifications can be made without departing from the scope or spirit of the invention.

I claim:

1. A template for guiding a tool having a cutting bit having an edge so as to form a repeating interlocking pattern in the edge of a panel, the template comprising:

a straight edge defined upon an edge of the template; and a plurality of identical notches extending into the template from the straight edge, each notch having an S-shaped side wall defined by two joined oppositely facing circular curves each having a radius, the curves being smoothly connected with one another, the radius of one circular curve being equal to a given distance, the radius of the other circular curve being equal to three times the given distance; whereby, when the straight edge of the template is aligned with an edge of the panel and when a cutting tool is supported against the template such that an edge of the cutting tool is spaced from the template by the given distance and when the cutting tool is directed along the straight edge and the notches of the template, the cutting tool will form a repeating pattern in the panel which is capable of interlocking with an identical pattern formed in a second panel so as to form a self-locking joint.

2. The template as claimed in claim 1, wherein the radius of each circular curve emanates from a center lying along a common axis perpendicular to the straight edge of the template.

3. The template as claimed in claim 1, wherein the given distance is 0.063 inches.

4. A template for guiding a router bit having an edge so as to form an interlocking, self-mating joint pattern in an edge of a work piece, the template comprising:

a planar body having an elongated edge;

a repeating pattern of notches projecting inwardly along the elongated edge into the body;

each notch being bound by two side walls and a bottom wall, at least one of the side walls being configured as an S-shaped wall having a first radius, projecting into the notch, and a second radius, projecting into the body, the template being configured so that the second radius is equal to three times the first radius.

5. The template as claimed in claim 4, wherein the first radius is equal to 0.063 inches.

6. The template as claimed in claim 4, wherein adjacent notches are spaced apart by at least 0.375 inches.

7. A template for forming a repeating, interlocking pattern using a rotating cutting tool spaced apart from the template by a fixed distance, the pattern formed in a work piece having an upper surface, the template comprising:

a body having an elongated edge and a lower surface, the lower surface of the body positionable against the upper surface of the work piece;

a plurality of notches formed in the elongated edge of the body, each notch having a first side, a second side, and an innermost edge, the notches positioned along the elongated edge at equal intervals, the first side of each notch being approximately S-shaped having an outer curved portion having an outer radius and an outer center point, the outer radius being equal to a given distance which is equal to the fixed distance which the cutting tool is spaced from the template, an inner curved portion having an inner radius and an inner center point, the inner curved portion formed so as to curve in a direction opposite to the outer curved portion, the inner radius being equal to three times the given distance, the inner curved portion and outer curved portion being formed so that the outer center point and the inner center point are aligned along an axis approximately perpendicular to the work piece edge, the innermost edge being configured to be complementary to the elongated edge of the body; and the second side being substantially perpendicular to the elongated edge of the body.

8. The template claimed in claim 7, the template having two ends, each end being spaced apart from the nearest inner center point by a particular distance.

9. The template claimed in claim 7, wherein the inner radius of the inner curved portion is 0.188 inches.

10. The template claimed in claim 7, wherein the distance between the outer center points of adjacent notches is 1.25 inches.

* * * * *